US008256717B2

(12) United States Patent
Sadeck

(10) Patent No.: US 8,256,717 B2
(45) Date of Patent: Sep. 4, 2012

(54) GROUND IMPACT CARGO PARACHUTE RELEASE MECHANISM

(75) Inventor: James E. Sadeck, East Freetown, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 172 days.

(21) Appl. No.: 12/794,931

(22) Filed: Jun. 7, 2010

(65) Prior Publication Data

US 2011/0297791 A1 Dec. 8, 2011

(51) Int. Cl.
*B64D 17/38* (2006.01)

(52) U.S. Cl. .................... 244/151 B; 294/82.25

(58) Field of Classification Search ............. 244/151 B, 244/151 A, 147; 294/82.25
See application file for complete search history.

(56) References Cited

U.S. PATENT DOCUMENTS

| | | | | |
|---|---|---|---|---|
| 2,473,554 | A | * | 6/1949 | Warner et al. ............... 24/645 |
| 2,541,509 | A | * | 2/1951 | Frieder et al. ............ 294/82.25 |
| 3,121,584 | A | * | 2/1964 | Bendl ...................... 294/82.33 |
| 3,781,055 | A | * | 12/1973 | Keich et al. .............. 294/82.25 |
| 4,623,109 | A | | 11/1986 | Sadeck |
| 4,955,563 | A | | 9/1990 | Lee et al. |
| 5,388,787 | A | | 2/1995 | Webb et al. |
| 6,644,597 | B1 | | 11/2003 | Bahniuk |
| 6,669,146 | B2 | | 12/2003 | Lee et al. |
| 7,461,817 | B1 | | 12/2008 | Hansson et al. |
| 2008/0302917 | A1 | | 12/2008 | Sadeck |

* cited by examiner

*Primary Examiner* — Tien Dinh
*Assistant Examiner* — Richard R Green
(74) *Attorney, Agent, or Firm* — Roger C Phillips

(57) ABSTRACT

A ground impact cargo parachute release mechanism includes a pair of interlocking release elements, one for connection to the parachute the other the cargo; each release element has a pawl and a notch for engaging the pawl of the other release element; a shear pin mounted in both the release elements shears upon parachute opening and enables the pawls and notches to engage; a bias device urges the elements apart upon impact of the load with the ground releasing the pawls from engagement with the notches.

3 Claims, 2 Drawing Sheets

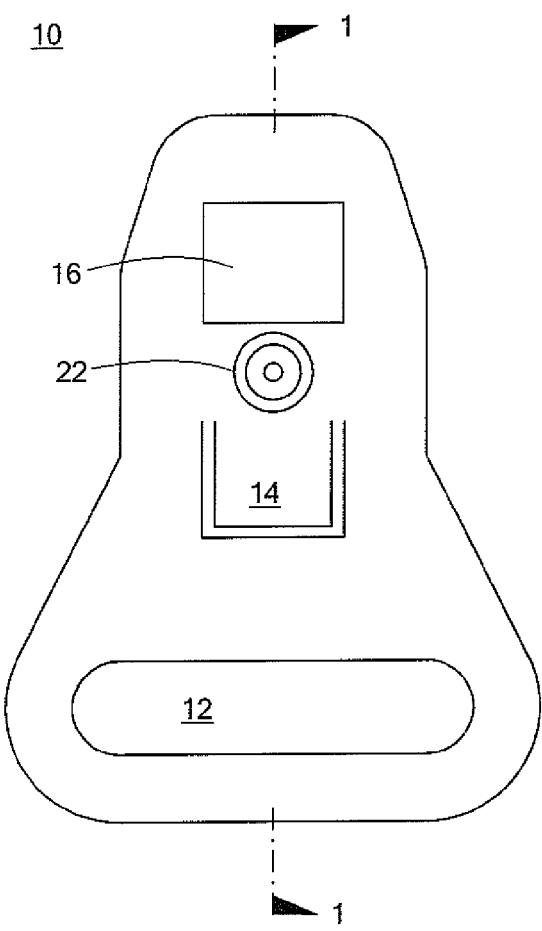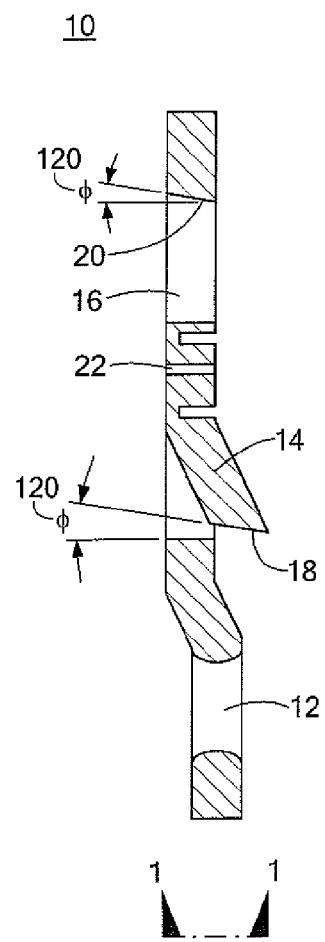
*FIG. 1*  *FIG. 2*

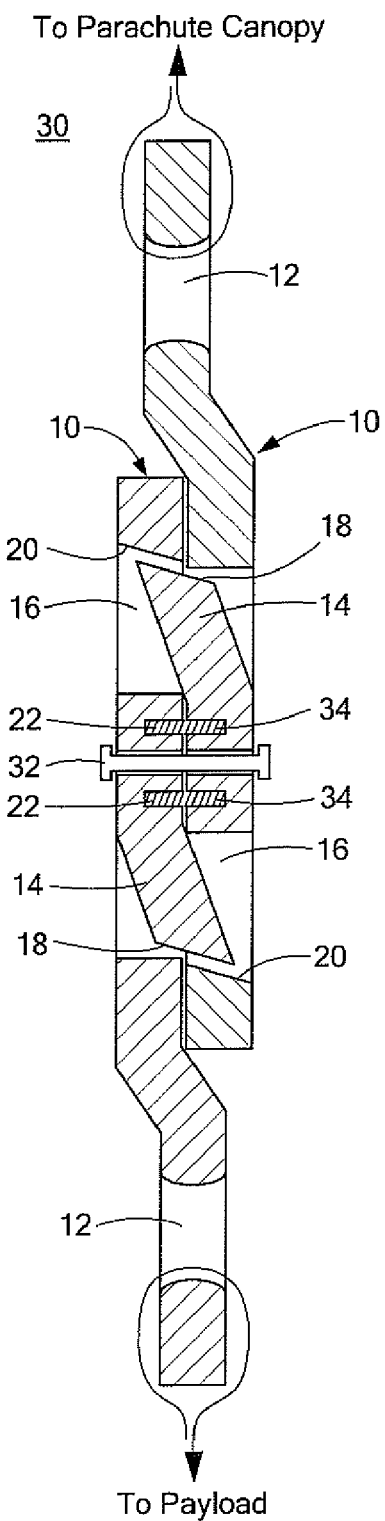
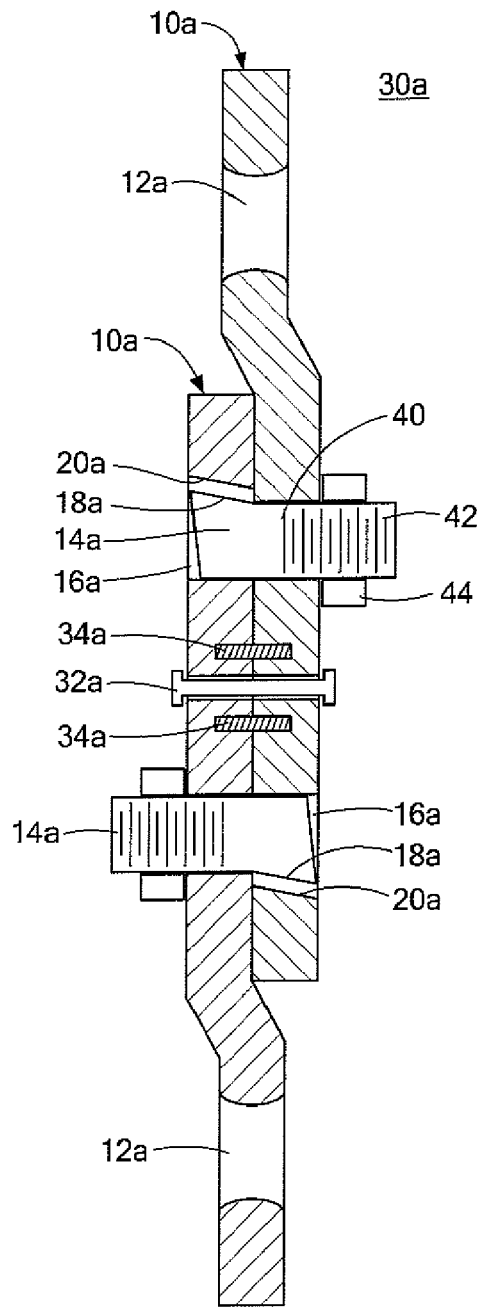
FIG. 3
FIG. 4

GROUND IMPACT CARGO PARACHUTE RELEASE MECHANISM

FIELD OF THE INVENTION

This invention relates to a ground impact cargo parachute release mechanism.

BACKGROUND OF THE INVENTION

Parachutes are frequently used to deliver payloads to specific locations on the ground when it is not possible for aircraft to land. Typically, such locations are isolated and not accessible by other means of transportation. Parachutes have become one of the main forms of payload delivery to military or civilian personnel located in isolated areas.

If the parachute remains connected to the payload when the payload hits the ground, winds or other air-turbulence can cause the parachute to drag the payload over the ground. This can damage or destroy the payload, see U.S. Patent Publication 2008/0302917 A1. One recent innovation uses a release mechanism with its two release elements fully engaged. A safety tie which is released upon deployment of the parachute compresses a spring that seeks to drive the release elements apart to release the cargo from the parachute when the release elements release upon impact of the cargo with the ground. After the tie is released only the opposing forces applied by the parachute and load keep the release elements together until the cargo impacts the ground. While this approach works well it requires the added complexity and cost of the tie ring and lanyard connected to it to cause its release upon parachute deployment.

SUMMARY OF THE INVENTION

It is therefore an object of this invention to provide an improved ground impact cargo parachute release mechanism.

It is a further object of this invention to provide such an improved ground impact cargo parachute release mechanism which is simpler, less expensive and reusable and is readily replaceable and repairable in whole or in part.

The invention results from the realization that an improved ground impact cargo parachute release mechanism can be achieved with a pair of interlocking release elements, one for connection to the parachute the other the cargo, each release element having a pawl and a notch for engaging the pawl of the other release element; a shear pin mounted in both the release elements for shearing upon parachute opening and enabling the pawls and notches to engage; and a bias device for urging the elements apart upon impact of the load with the ground releasing the pawls from engagement with the notches.

The subject invention, however, in other embodiments, need not achieve all these objectives and the claims hereof should not be limited to structures or methods capable of achieving these objectives.

This invention features a ground impact cargo parachute release mechanism including a pair of interlocking release elements, one for connection to the parachute the other the cargo. Each release element has a pawl and a notch for engaging the pawl of the other release element. A shear pin is mounted in both the release elements for shearing upon parachute opening and enabling the pawls and notches to engage. A bias device urges the elements apart upon impact of the load with the ground releasing the pawls from engagement with the notches.

In preferred embodiments the pawls may be integral with the release elements. The pawls may be discrete members removably secured to their respective release elements. The pawls may have an engaging surface inclined at angle for engaging the associated the notches. The notches may have an engaging surface inclined at an angle for engaging the pawls. The angle may be approximately 8°-14°. The bias device may include a spring. Each release element may include a recess for receiving a portion of the bias device. Each release element may include a mounting hole for connection to the cargo or parachute

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 1 is a diagrammatic front elevation view of one of two release elements used in the release mechanism in one embodiment of this invention;

FIG. 2 is a side, elevational view of the release element of FIG. 1;

FIG. 3 is a diagrammatic side sectional elevational view of an embodiment of a release mechanism according to this invention using a pair of release elements as shown in FIGS. 1 and 2;

FIG. 4 is a view similar to FIG. 3 of a release mechanism with removable, replaceable parts.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

This invention enables releasing a parachute from its payload automatically upon ground impact of the load in a simpler less expensive package. The purpose of the release is to prevent damage from occurring to the payload due to the parachute overturning and dragging it. The embodiment described herein and the invention in general is scaleable for use with different weight payloads.

The invention relates to a ground impact cargo parachute release mechanism which includes a pair of interlocking release elements, one of which 10 is shown in FIG. 1. Release element 10, is used in pairs. Each release element includes a hole 12, in one release element hole 12 engages the parachute rigging in the other the cargo rigging. Each release element 10 also includes a pawl 14 and a notch 16. Viewing FIGS. 1 and 2 together it can be seen that pawl 14 is integral with release element 10: in fact, it is simply punched out. Pawl 14 on one release element 10 engages the notch 16 on the other release element. On each release element the end 18 of pawl 14 is inclined at an angle of approximately 8°-14° and engages with a similar mating inclined surface 20 in notch 16 which also may be at an angle φ of approximately 8°-14° or thereabouts. Each release element also contains a circular recess 22 for housing a spring urging the release elements apart upon impact of the load with the ground releasing the pawls 14 from the notches 16. The complete release mechanism 30 is shown in FIG. 3 comprising two release elements 10. There it can be seen that release elements 10 and 10 are held together by means of shear pin 32 against the urging of a bias device such as spring 34 in recess 22. After the parachute and payload is deployed from an aircraft the main recovery parachute is deployed. During the opening phase of the parachute canopy the peak opening force is reached and it is sufficient to cause shear pin 32 to shear and the surfaces 18 of the pawl and 20 of the notch engage drawing the two release elements 10 tightly together. The units then remain tightly engaged together until the ground impact of the load releases the tension in the parachute system. Now the two release elements 10 which are no longer held by the opposing forces of the parachute and the payload and no longer held together by the shear pin come apart with an assist from spring 34. Once separated the parachute canopy is disconnected from the payload preventing ground winds from re-opening the parachute canopy and damaging the payload by overturning it or dragging it.

In another embodiment of the invention pawl 14*a*, FIG. 4, is removable and replaceable in each release element 10*a*. Each pawl 14*a* has one end received in notch 20*a* and its other end is received in bore 40 and is threaded as at 42 for engaging a securing nut 44. In this embodiment pawls 14*a* may be easily replaced without the cost of replacing the entire release element 10*a* whether because of wear or damage.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An apparatus for releasing a parachute from its payload upon ground impact by the payload, comprising:
    a pair of release elements releasably secured to each other, each release element comprising:
        an intermediate portion having a longitudinally extending axis and a pawl receiving notch that extends through the intermediate portion and is transverse to the longitudinally extending axis, the pawl receiving notch defined by a pawl engaging surface having a portion that has an angle of between about 8 degrees and about 14 degrees to an axis that is transverse to the longitudinally extending axis;
        a first end portion attached to the intermediate portion and comprising a pawl that extends in a generally lateral direction with respect to the longitudinally extending axis and which is angled with respect to the longitudinally extending axis, the pawl having a distal end surface that is at an angle that is complementary to the pawl engaging surface for forceable engagement therewith;
        a second end portion attached to the intermediate portion such that the intermediate portion is between the first and second end portions;
        a single spring member attached to the intermediate portion and oriented so that the spring member is compressed when the intermediate portion is pressed against the other releasable element; and
        a hole for attaching either the payload or the parachute to one of the releasable elements;
    wherein the pawl of one releasable element is disposed in the pawl receiving notch of the intermediate portion of the other releasable element and the spring members are compressed between the releasable elements thereby urging the sections away from each other; and
    a device engaging both releasable elements to counter the urging force produced by the spring members and keep the releasable elements compressed together, the device being responsive to the force produced by the opening of a parachute canopy such that upon the opening of the parachute canopy, the device disengages from the releasable elements so that the spring member will be free to forcefully release the releasable elements from each other upon ground impact by a payload that is supported by one of the releasable elements;
    the intermediate portion of each releasable element further comprising at least one additional opening that is located at a central axis of the spring member;
    wherein the device comprises a shear pin inserted through the at least one additional opening of each intermediate portion and solely connected with each intermediate portion.

2. The release mechanism of claim 1 in which said pawls are integral with said release elements.

3. The release mechanism of claim 1 in which said pawls are discrete members removably secured to their respective release elements.

* * * * *